US011584043B2

(12) United States Patent
Perez LLanos et al.

(10) Patent No.: US 11,584,043 B2
(45) Date of Patent: Feb. 21, 2023

(54) ULTRASONIC DEVICE FOR A POLYMER EXTRUDER MACHINE

(71) Applicant: Fundacio Eurecat, Cerdanyola del Valles (ES)

(72) Inventors: German Anibal Perez LLanos, L'Hospitalet de Llobregat (ES); Jose Antonio Marfil Romero, Cornella de Llobregat (ES); Maria Eugenia Rodriguez Sierra, Cerdanyola del Valles (ES); Maria del Carmen Verge Estefania, Tarragona (ES); Encarnacion Escudero Martinez, Barcelona (ES); Francisco Javier Planta Torralba, El Masnou (ES)

(73) Assignee: Fundacio Eurecat, Cerdanyola del Valles (ES)

( * ) Notice: Subject to any disclaimer, the term of this patent is extended or adjusted under 35 U.S.C. 154(b) by 0 days.

(21) Appl. No.: 17/264,353

(22) PCT Filed: Jul. 18, 2019

(86) PCT No.: PCT/EP2019/069364
§ 371 (c)(1),
(2) Date: Jan. 29, 2021

(87) PCT Pub. No.: WO2020/025338
PCT Pub. Date: Feb. 6, 2020

(65) Prior Publication Data
US 2021/0291412 A1  Sep. 23, 2021

(30) Foreign Application Priority Data
Jul. 30, 2018 (EP) .................................... 18382573

(51) Int. Cl.
*B29C 35/02* (2006.01)
*B29C 48/14* (2019.01)
(Continued)

(52) U.S. Cl.
CPC ........ *B29C 35/0261* (2013.01); *B29C 48/144* (2019.02); *B29C 48/254* (2019.02); *B29C 48/802* (2019.02)

(58) Field of Classification Search
CPC . B29C 35/0261; B29C 48/144; B29C 48/254; B29C 48/802; B29C 48/14; B06B 1/20
See application file for complete search history.

(56) References Cited

U.S. PATENT DOCUMENTS 4,382,535 A * 5/1983 Le Penven ........... B23K 3/0661
228/56.3
6,010,592 A * 1/2000 Jameson ................. D01D 1/04
425/464

(Continued)

FOREIGN PATENT DOCUMENTS

EP  1645381 A1  4/2006
EP  1536936 B1  8/2013
(Continued)

OTHER PUBLICATIONS

European Patent Office Search Report and Written Opinion for PCT/EP2019/069364, dated Oct. 1, 2019, entire document.

*Primary Examiner* — Galen H Hauth
(74) *Attorney, Agent, or Firm* — Allen, Dyer, Doppelt & Gilchrist, P.A.

(57) ABSTRACT

An ultrasonic device comprising a chamber (10) provided with an inlet bore (11), which receives a melted pressurized polymer, an outlet bore (12) and a sonotrode housing bore (13) through which a distal portion (21) of an ultrasonic head (20) is inserted into the chamber, wherein the distal portion is separated from the rest of the ultrasonic head by a first (Continued)

nodal plane (PN1) wherein there is a first surface (S1) in contact with a complementary surface of a ring seal (30) that closes the chamber, and wherein the ultrasonic head includes a second nodal plane (PN2) away from and parallel to the first nodal plane (PN1) coinciding with or adjacent to a second surface (S2) wherein an anchoring device (40) presses the ultrasonic head against the ring seal ensuring a tight closure.

12 Claims, 2 Drawing Sheets

(51) Int. Cl.
*B29C 48/25* (2019.01)
*B29C 48/80* (2019.01)

(56) References Cited

U.S. PATENT DOCUMENTS

| | | |
|---|---|---|
| 6,036,467 A | 3/2000 | Jameson |
| 6,528,554 B1 | 3/2003 | Isayev et al. |
| 2006/0165832 A1* | 7/2006 | Allan ...................... B29C 48/14 |
| | | 425/174.2 |
| 2013/0008132 A1* | 1/2013 | Vogler ................ B29C 66/1122 |
| | | 310/334 |

FOREIGN PATENT DOCUMENTS

| | | |
|---|---|---|
| WO | WO02066218 | 8/2002 |
| WO | 2004024415 | 3/2004 |
| WO | WO2007145918 | 12/2007 |
| WO | WO2012142562 | 10/2012 |

\* cited by examiner

ULTRASONIC DEVICE FOR A POLYMER EXTRUDER MACHINE

FIELD OF THE ART

The present invention relates to the field of ultrasonic devices for a polymer—thermoplastic, for instance—extruder machine, wherein the ultrasonic device acts on the melted or re-softened polymer (with or without additives) to improve the properties and the quality of the obtained product.

STATE OF THE ART

Ultrasonic devices are known in the industry for the melting and fluidification of polymers, typically including an ultrasonic transducer generating ultrasonic vibration and an ultrasonic head that transmits said vibration.

The inclusion of a distal portion of an ultrasonic device is known within a chamber whereby the melted polymer enters in a pressurized condition, allowing the ultrasonic device to be brought into contact therewith. The feeding of the polymer to the chamber is carried out by means of an extruder apparatus provided with one or two helical conveyors that compress and melt said polymer, pushing it within the chamber, from which it is extruded through an outlet opening. For example, document U.S. Pat. No. 6,528,554B1 shows a solution of this type.

In this type of device, a distal portion of the ultrasonic device, distal relative to the ultrasonic transducer, is inserted within the chamber through a sonotrode housing bore. To keep the melted polymer from being filtered through said sonotrode housing bore, a ring seal is arranged retained around a section of the ultrasonic head. To reduce the interference of the ring seal with the vibration of the ultrasonic head, said ring seal is attached in a proximal position to a nodal plane of the ultrasonic head.

It will be understood that the ring seal may or may not have a circular shape.

Frequently, said ring seal keeps the ultrasonic head in a radial direction so that, in order to increase the contact surface between the ring seal and the ultrasonic head, the ring seal will cover adjacent areas of the nodal plane, where the vibration amplitude is not zero, causing the wear of said ring seal. Document EP1536936B1 shows a solution of this type.

In other alternative solutions, the ultrasonic head will be provided, coinciding with said nodal plane, with an annular projection in the shape of a flange surrounding it. The ring seal is attached above and underneath said flange retaining it and achieving a tight sealing. Document U.S. Pat. No. 6,036,467A, for example, shows a solution of this type.

However, said flange has a certain thickness and, therefore, its upper and lower surfaces, where the ring seal is attached, are not coplanar with the nodal plane, but are adjacent thereto; therefore, the vibration amplitude in those two planes will not be zero, but, being reduced, a certain vibration will exist that produces the deterioration of the ring seal over time. Additionally, the manufacturing of the ultrasonic head provided with said flange entails a complication and the increase in cost thereof.

BRIEF DESCRIPTION OF THE INVENTION

The present invention relates to an ultrasonic device for an extrusion machine of melted or re-softened polymers (with or without additives) by means of an extruder apparatus.

It is understood that an ultrasonic device is a device comprising an ultrasonic transducer, which makes an ultrasonic head vibrate which, placed in contact with the melted polymer by means of the extruder apparatus, modifies its physicochemical properties by the effect of the vibration and of the heat generated by said vibration.

It will be understood that an extruder apparatus of a polymer is an apparatus intended to melt, mix and convey a polymer to the extrusion outlet. The inclusion of an ultrasonic device in contact with the melted polymer is also known in this type of apparatus, typically in a proximal position to the extrusion outlet bore, such that the polymer be treated by the ultrasonic device before being extruded outside the extrusion machine, although it may also be located in other positions along the extruder apparatus.

In the present invention, the proposed ultrasonic device includes, in a manner known per se in the industry

- a chamber provided with an inlet bore for a melted pressurized polymer, provided with an outlet bore for the melted pressurized polymer, and provided with a sonotrode housing bore, said chamber being connectable or integrable in a polymer extruder apparatus which introduces the melted pressurized polymer through the inlet bore;
- an ultrasonic head including at least one sonotrode, the ultrasonic head being provided with a distal portion and with a proximal portion separated by a first nodal plane, wherein the distal portion is totally constituted by said sonotrode and is introduced in the chamber through the sonotrode housing bore projecting in cantilever into the chamber, the distal portion being intended to remain in contact with the melted pressurized polymer contained in the chamber, and wherein the proximal portion, which is at least partially constituted by said sonotrode, remains outside the chamber and in connection with an ultrasonic transducer and includes at least a second nodal plane away from and parallel to the first nodal plane;
- a ring seal in contact with the ultrasonic head in coincidence with the first nodal plane and the ring seal being configured to seal the sonotrode housing bore of the chamber containing the melted pressurized polymer.

It will be understood that the ring seal may be circular, or have any other closed geometric shape.

The polymer extruder apparatus is a device that melts and pressurizes the resulting melted polymer into the chamber through the inlet bore, thus getting the chamber to be filled with the melted and pressurized polymer, which pushes it to exit through the outlet bore. The chamber may be located after the extruder apparatus or may be integrated in the extruder apparatus, said chamber remaining between two portions of the extruder apparatus or traversed by part of said extruder apparatus.

The ultrasonic device modifies the polymer properties before its extrusion, to ensure, for example, that there is no presence of pellets or non-melted particles and that its texture is homogeneous before the extrusion, to improve the additive dispersion in the melted polymer, improve the mixing of polymers of different classes, improve productivity, reduce polymer degradation and even reduce the energy consumption of the machine.

The ultrasonic device consists of an ultrasonic transducer generating ultrasonic vibration, in contact with an ultrasonic head that transmits said vibration to the inner portion that is projected within the chamber where it remains in contact with the polymer.

Typically, the polymer extruder apparatus consists of an inlet for material in pellet or powder form on an end of the cylindrical fusion chamber, which contains one or two spindles, although other embodiments are also contemplated. In the apparatuses of this type, the rotation of the spindles compresses the polymer, conveys, kneads and mixes it with additives if there are any, being also liable to include heaters that increase the temperature of the polymer to favour its melting. The flow of melted polymer is introduced into the chamber that contains the distal portion of the ultrasonic head through an inlet bore for its treatment. Said chamber may be located at the end of the cylindrical fusion chamber of the extruder apparatus, or in an intermediate portion thereof, so that the one or more spindles go through said chamber of the ultrasonic device.

The melted polymer goes through the chamber of the ultrasonic device and exits therefrom through the outlet bore driven by the pressure applied thereon by the extruder apparatus, said polymer being then guided to a forming die where the polymer is extruded to the desired shape.

When the chamber of the ultrasonic device is connected to the end of the extruder apparatus, the forming die may be placed in the outlet bore of said chamber. If, on the contrary, the chamber of the ultrasonic device is integrated in an intermediate portion of the extruder apparatus, the polymer will be removed from said chamber by the extruder apparatus itself that will guide it to an outlet of the extruder apparatus connected to said forming die.

The ultrasonic head is provided with a distal portion, contained within the chamber, and with a proximal portion, arranged outside the chamber, the entire ultrasonic head being subjected to an ultrasonic vibration in the shape of a stationary wave.

In any body subjected to a vibration in the shape of a stationary wave, one or several planes are generated wherein the vibration is zero; these planes are known as nodal.

Between the distal portion and the proximal portion there is a first nodal plane, and the proximal portion of the ultrasonic head also includes a second nodal plane parallel to and away from the first nodal plane.

In the present case, the distal portion of the ultrasonic head is within the chamber, in contact with the melted pressurized polymer. To keep said melted polymer from flowing outside the chamber through the sonotrode housing bore of the chamber instead of through the outlet bore, a ring seal is arranged around the ultrasonic head, in coincidence with the first nodal plane where the vibration is zero. This keeps the ring seal from interfering with the vibration of the ultrasonic head, while avoiding the wear of said ring seal due to vibration.

The present invention proposes, in a way unknown to the state of the art, that:
- the first nodal plane be coplanar with a first annular surface of the ultrasonic head on which an annular surface of the ring seal rests parallel to the first surface;
- the second nodal plane is coplanar with or coplanar to a second surface of the ultrasonic head, parallel to the first surface, an anchoring device being attached or supported on said second surface;
- a pressure device is connected at least to the anchoring device, and applies pressure in a direction perpendicular to the first surface, compressing at least part of the proximal portion between the anchoring device and the ring seal, transmitting pressure to the ring seal through the proximal portion of the ultrasonic head, producing a tight sealing of the chamber.

Thus, it is proposed that the ultrasonic head be provided with a first annular surface coplanar to the first nodal plane where, therefore, the vibration will be zero in all points of its surface, and with a second surface, annular or not, coplanar or adjacent to the second nodal plane. Therefore, said first and second surfaces are parallel to each other.

The second surface may be defined, for example, in an annular bulge in the shape of a flange around the ultrasonic head, or in an annular slot or step created in said ultrasonic head.

A pressure device will apply pressure on the second surface of the ultrasonic head through an anchoring device attached to or resting on said second surface of the ultrasonic head where, thanks to its correspondence of or proximity to the second nodal plane, the amplitude of the vibration will be zero or reduced.

The pressure applied by the pressure device will be perpendicular to the first and second surfaces of the ultrasonic head, and will push the second surface in the direction of the first surface.

The first surface of the ultrasonic head will be in contact with an annular surface of the ring seal and will be pressed against it thanks to the pressure applied by the pressure device, achieving a tight sealing between both surfaces that will not be affected by the vibration of the ultrasonic head, since the first surface coincides with the first nodal point and, therefore, the amplitude of the vibration is zero on all its surface.

According to an embodiment of the invention, the proximal portion of the ultrasonic head may be at least partially constituted, besides the sonotrode, by an ultrasonic amplifier sandwiched between the sonotrode and the ultrasonic transducer. In such a case, it is not recommended that the second nodal plane should coincide with the joint between the ultrasonic amplifier and the sonotrode, since greater stresses exist in this region that could damage the joint between both elements.

Alternatively, it is also contemplated that all of the proximal portion of the ultrasonic head be constituted by the sonotrode, no ultrasonic amplifier existing.

In any case, the distal portion of the ultrasonic head will have a smaller cross section than the proximal portion of the ultrasonic head, and in the transition between the smaller cross section distal portion and the larger cross section proximal portion, the first annular surface of the ultrasonic head, coinciding with the first nodal plane, will be defined.

It is also contemplated that a third annular surface be arranged around the sonotrode housing bore of the chamber in contact with another annular surface of the ring seal and opposite the first annular surface of the ultrasonic head.

In such a case, the ring seal will be a tubular body, not necessarily circular, retained between the first annular surface and the third annular surface thanks to the pressure applied by the pressure device, which will avoid the leakage of melted polymer through both gaskets.

The space contained between the distal portion of the ultrasonic head and the surrounding ring seal, which will be filled with polymer, will be considered to also form part of the chamber.

The third annular surface may define an annular seat configured to provide a precise positioning of the ring seal.

Preferably, the ring seal will be metallic or ceramic, which makes it much more resistant to high temperatures and to the vibration compared with other materials such as the majority of plastics. The use of metal or ceramic to form said ring seal is possible thanks to its contact with the ultrasonic head being produced exactly by the first nodal plane where the amplitude of the vibration is zero. Attaching the ring seal to any other surface of the ultrasonic head, even if it were in a position adjacent to the first nodal plane, would subject said ring to vibrations that require the use of materials with a certain degree of flexibility, such as some types of plastics or rubbers, but which, with vibrations and temperature, suffer from wear and cause leakages of melted polymer.

According to another embodiment, the ring seal defines an inner gap with a larger cross section than the cross section of the distal portion of the sonotrode, said cross section difference between both elements preferably being equal or lower than 2.5 mm.

This size difference allows the vibration of the distal portion in its interior without it interfering with the walls of the ring seal arranged surrounding it. Additionally, this space will form an annular duct in communication with the rest of the chamber, lengthening it, which will be filled with polymer. Within said annular duct, the vibration amplitude of the distal portion will be smaller the closer it is to the first nodal plane, getting to be zero. This means that the polymer contained in said annular duct will solidify in the area coinciding with the first surface of the ultrasonic head, cooperating with the sealing of the gasket, avoiding polymer leaks therethrough.

Said pressure device will include, according to a preferred embodiment, a number of connectors attached by one end to the anchoring device and by another end to a body that contains the chamber. The force applied by the connectors will compress the proximal portion of the ultrasonic head ensuring the correct sealing of the chamber. Preferably, the force produced by the pressure device will be adjustable.

An exemplary embodiment of the pressure device may consist of multiple bars arranged around the ultrasonic head, perpendicular to the first and second nodal planes, that serve as a guide for an axial displacement of the anchoring device, and a number of tightening devices that allow to apply an amount of stress to the ultrasonic head. The anchoring device may be, for example, a flat plate parallel to the first and second nodal planes with a hole to allow the passage of a part of the ultrasonic head therethrough supporting a peripheral part of said hole on the second surface of the ultrasonic head.

If said flat plate constitutive of the anchoring device included a number of through holes in its periphery through which the described bars could be inserted as part of the pressure device, said bars would be able to guide the axial displacement of the anchoring device. If, in addition, the bars were threaded and nuts were included as tightening devices, pressure could be adjusted to that the ultrasonic head adjusting said nuts is subjected to.

Other solutions are also contemplated, such as, for example, the use of pistons or springs.

It is also contemplated that the body that contains the chamber be formed by a single piece or by two or more coupled complementary half bodies. In the case of being formed by two or more half bodies, it is preferable that the inlet bore and the outlet bore be defined in the joining plane between both half bodies, being partially defined in one or the other of the two opposed half bodies, such that by separating said half bodies the interior of said inlet and outlet bores will be easily accessible, allowing the cleaning of any polymer remain that might be left.

Preferably, the sonotrode housing bore will be defined in one of said half bodies and the pressure device will also be attached to this half body, such that this half body, the ring seal, the anchoring device and the ultrasonic head form one joint assembly. This will allow to separate the two half bodies for cleaning or maintenance tasks of the interior of the chamber and of the bores without the need to uncouple the ultrasonic head from the half body to which it is attached.

Other characteristics of the invention will appear in the following detailed description of an exemplary embodiment.

BRIEF DESCRIPTION OF THE FIGURES

The foregoing and other advantages and characteristics will be more completely understood from the following detailed description of an exemplary embodiment with reference to the attached drawings, which must be taken by way of illustration and not limitation, wherein.

DETAILED DESCRIPTION OF AN EXEMPLARY EMBODIMENT

Figure 1:
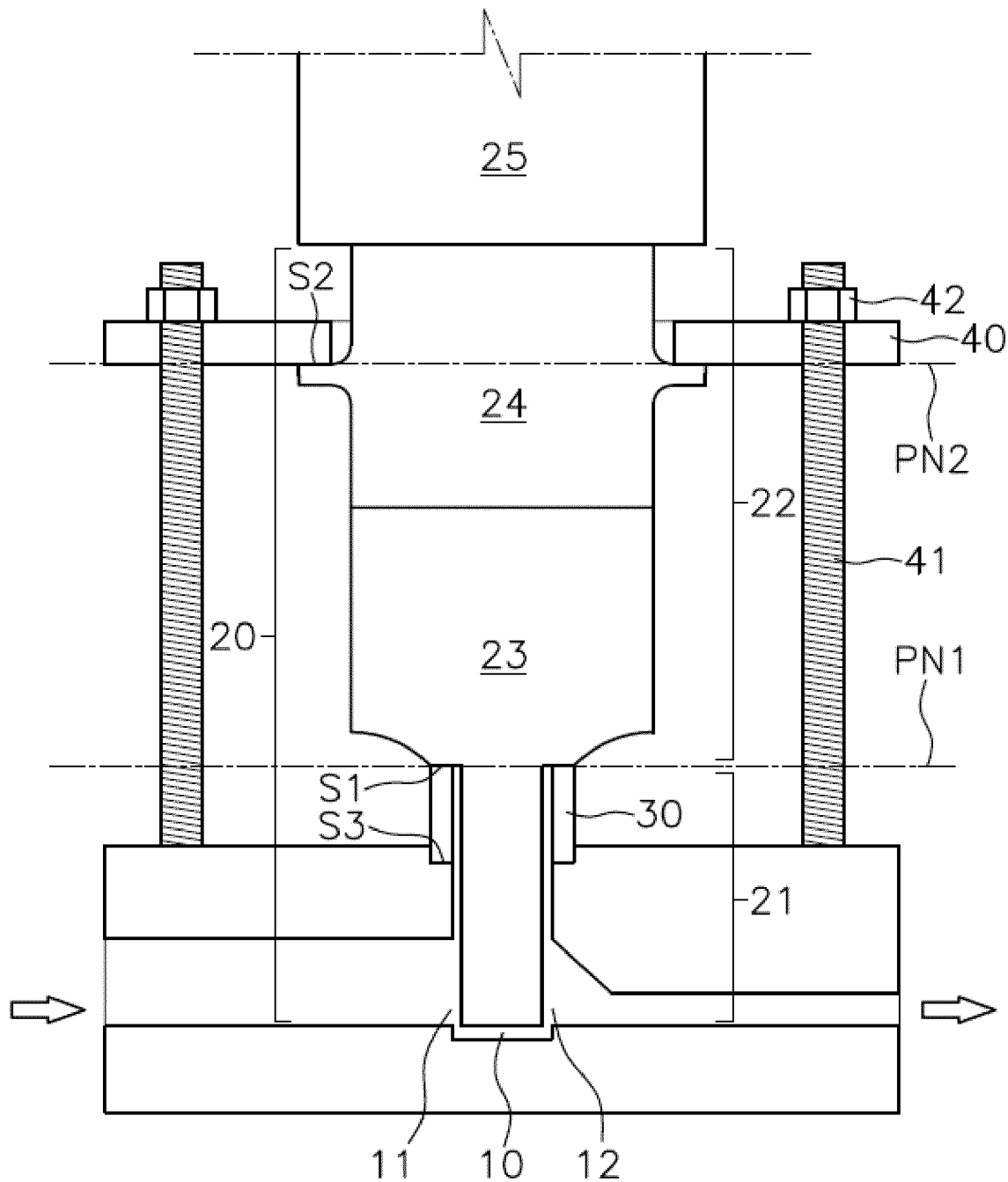
FIG. 1 shows a schematic cross section of the ultrasonic device wherein the polymer extruder apparatus is not shown but wherein the direction in which the melted polymer is displaced from said extruder apparatus to the outlet bore is indicated, by means of an arrow, shown in a simplified way.
Figure 2:
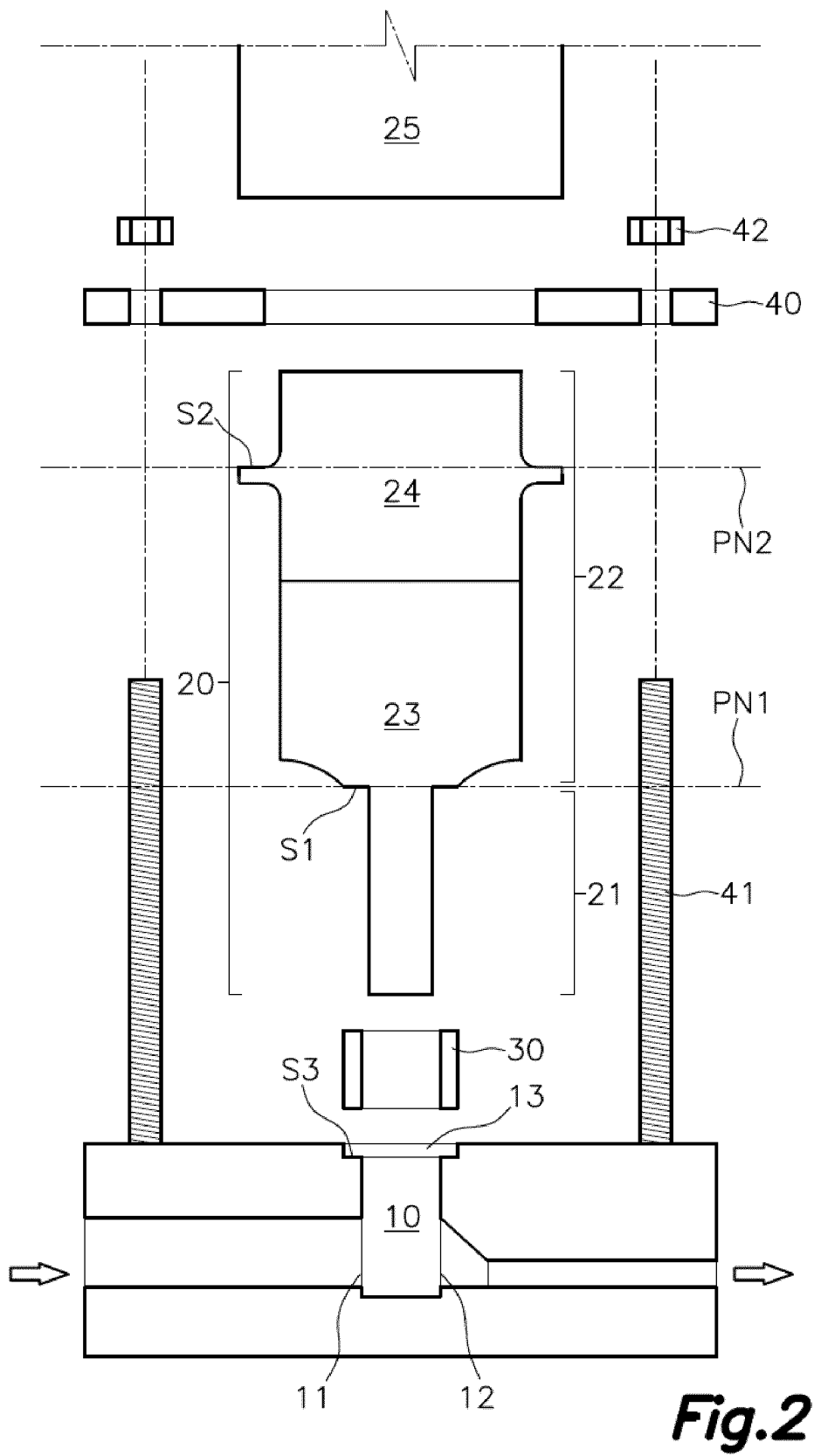
FIG. 2 shows the same ultrasonic device of FIG. 1 but in an exploded view.

The attached figures show exemplary embodiments with an illustrative non-limiting character of the present invention.

According to a preferred embodiment, the proposed ultrasonic device will be specially adapted for its use in a polymer extrusion machine (with or without additives).

Said extruder includes a polymer extruder apparatus that pressurizes the melted polymer into the chamber 10 through an inlet bore 11. Said chamber will be provided, in addition to inlet bore 11, with a sonotrode housing bore 13 and with an outlet bore 12 connected to a forming die that determines the geometry of the extruded polymer product produced by said extruder apparatus.

The inlet 11 and outlet 12 bores may be aligned or not aligned.

The polymer extruder apparatus includes, in this example, a cylindrical fusion chamber, which contains one or two spindles and a granular polymer inlet at the beginning of the cylindrical fusion chamber, although other embodiments are also contemplated. In the apparatus of this type, the rotation of the spindles compresses the polymer, conveys, kneads and mixes it with additives, if there are any, being also capable of including heaters that increase the temperature of the polymer to favour its melting. The melted polymer flow is introduced in the chamber that contains the distal portion of the ultrasonic head through an inlet bore 11.

Said chamber containing the distal portion of the ultrasonic head may be connected, through the inlet bore, at the end of the extruder apparatus, or, on the contrary, may be integrated in an intermediate portion of said extruder apparatus, such that the vibration produced by the ultrasonic head will be applied to the polymer contained in the extruder apparatus. In such an embodiment, the spindle, or the spindles, will preferably go through said chamber, although it is also contemplated that one or two spindles may be located before and one or two after said chamber.

The proposed ultrasonic device is formed by a vibration-generating ultrasonic transducer 25 in connection with an ultrasonic head 20 to which it transmits the generated vibration.

Said ultrasonic head 20 will be formed, in turn, by an ultrasonic amplifier 24 in direct contact with the ultrasonic transducer 25, and by a sonotrode 23 connected to said ultrasonic amplifier 24.

A distal portion 21 of the ultrasonic head 20, corresponding to a portion of the sonotrode 23, will be contained within the chamber 10 inserted projecting in cantilever into it through the sonotrode housing bore 13, said distal portion 21 remaining in contact with the pressurized melted polymer to which vibration is applied modifying its properties before exiting through the outlet bore 12 of the chamber.

The rest of the ultrasonic head 20 constitutes a proximal portion 22 that remains outside the chamber 10.

The ultrasonic transducers 25 typically generate a vibration in the shape of a sinusoidal wave that spreads in the ultrasonic head 20 in the shape of a stationary wave. Any body subjected to a stationary wave generates one or several nodal planes wherein the vibration amplitude will be zero at all times.

The proposed ultrasonic head 20 will be configured so that a first nodal plane PN1 is defined between the distal portion 21 and the proximal portion 22. This allows that, in correspondence of said first nodal plane PN1, a ring seal 30 may be arranged around the ultrasonic head 20, and in contact therewith, thus sealing the sonotrode housing bore 13, keeping the melted pressurized polymer contained in the chamber 10 from flowing towards the outside the chamber 10 therethrough.

Said ring seal 30 could affect the vibration of the ultrasonic head 20, or said vibration could affect the sealing produced by the ring seal 30. For this reason, it is proposed that the ring seal 30 consists of a tubular body through which the distal portion 21 of the ultrasonic head 20 is inserted, said tubular body being provided with an annular surface of the ring seal 30 parallel and coplanar to the first nodal plane PN1 of the ultrasonic head 20. The ultrasonic head 20 is also provided with a first annular surface S1 coplanar with the first nodal plane PN1 complementary with the annular surface of the ring seal 30.

In an assembled position, the ultrasonic head 20 is arranged with its first annular surface S1 resting on and in contact with the annular surface of the ring seal 30.

Said surfaces being coplanar with the first nodal plane PN1, the vibration amplitude on all points of said annular surface will be equal to zero, so that the sealing produced between both will not be affected by the vibration of the ultrasonic head 20.

The ultrasonic head 20 will also be configured to generate, in its proximal portion 22, a second nodal plane PN2 parallel to and separated from the first nodal plane PN1. Preferably, said second nodal plane PN2 will be away from the joint between the sonotrode 23 and the ultrasonic amplifier 24, to avoid subjecting said joint to excessive stresses that may damage the joining means, such as, for example, a threaded joint.

The ultrasonic head 20 will also be provided with a second surface S2 parallel to the first surface S1 and coplanar or adjacent to the second nodal plane PN2, such that the vibration amplitude in the second surface S2 will be zero or highly reduced.

The second surface S2 may be formed by multiple second partial surfaces, all of them coplanar to each other, forming an annular discontinuous surface, without this affecting the invention.

An anchoring device 40, which in this embodiment it is proposed to be a flat plate provided with a central through hole through which part of the ultrasonic head 20 goes, is placed resting on and in contact with the second surface S2, the periphery of said central hole remaining in contact with the second surface S2 of the ultrasonic head 20.

A pressure device 41 applies pressure to said anchoring device 40 in a direction perpendicular to the first and second nodal planes PN1 and PN2, which is transmitted to the ultrasonic head 20 through the second surface S2, compressing part of the ultrasonic head 20 against the ring seal 30, thus ensuring that the pressure of the melted polymer contained in the chamber 10 does not causes leaks through the joint of the ring seal 30 with the first surface S1 of the ultrasonic head 20. The pressure applied by the pressure device 41 will be greater than the pressure of the melted polymer of the chamber 10.

The arrangement of the first surface S1 and the geometry of the ring seal 30, together with the compression direction applied on the ultrasonic head 20, produces a sealing between the ultrasonic head 20 and the ring seal 30 in an axial direction of said ultrasonic head 20, instead of in a radial direction, as is common in the art.

In the present embodiment, the pressure device 41 consists of at least two bars parallel to each other and perpendicular to the first and second nodal planes PN1 and PN2 of the ultrasonic head 20 that have an end attached to a body that contains the chamber 10 and an end that traverses through holes of the anchoring device 40, allowing for the guidance of the anchoring device in an axial direction defined by the bars.

Said bars will preferably be threaded bars and will be provided with a number of nuts as a tightening device 42 that will allow to shift the anchoring device 40 towards the body that contains the chamber 10 compressing the sandwiched ultrasonic head 20. Alternatively, it is contemplated that the threaded bars may rotate, driven by a motor, for example, the nuts being attached to or integrated in the anchoring device 40.

It is also proposed that the ring seal 30 be an independent piece of the body that contains the chamber 10, thus facilitating its maintenance and replacement. In such a case, the body that contains the chamber 10 will be provided, around the sonotrode housing bore 13, with a third surface S3 parallel and opposite to the first surface S1 of the ultrasonic head 20, and the ring seal 30 will also have an annular flat surface configured to remain seated on the third surface S3, retaining the ring seal 30 between the ultrasonic head 20 and the body that contains the chamber 10. The pressure applied by the pressure device ensures that both gaskets of the ring seal 30 are sealed, avoiding the ejection of the melted polymer.

It will be understood that the different parts that constitute the invention described in an embodiment may be freely combined with the parts described in other different embodiments even if such a combination has not been explicitly described, provided that no prejudice exists in the combination.

The invention claimed is:

1. An ultrasonic device for a polymer extruder, the ultrasonic device comprising:
 a chamber configured to retain a melted pressurized polymer comprising an inlet bore operatively connected to a polymer extruder apparatus configured to feed the melted pressurized polymer into the chamber through the inlet bore, an outlet bore configured to extrude the melted pressurized polymer, and a sonotrode housing bore,
an ultrasonic head comprising a distal portion substantially defined by the at least one sonotrode and disposed in the chamber through the at least one sonotrode housing bore and projecting in cantilever into the chamber, and a proximal portion separated from the distal portion by a first nodal plane;

the distal portion is configured to remain in contact with the melted pressurized polymer contained in the chamber, the proximal portion is configured to remain outside the chamber and in connection with an ultrasonic transducer, the proximal portion comprising at least a second nodal plane disposed away from and parallel to the first nodal plane;

a ring seal disposed in contact with the ultrasonic head and coincident with the first nodal plane, the ring seal configured to seal the at least one sonotrode housing bore of the chamber that contains the melted pressurized polymer;

the first nodal plane being coplanar with a first surface of the ultrasonic head, the first surface being annular, and with a first annular surface of the ring seal disposed parallel to the first surface of the ultrasonic head;

the second nodal plane being coplanar with a second surface of the ultrasonic head and parallel to the first surface of the ultrasonic head, an anchoring device being attached to the second surface of the ultrasonic head, a pressure device connected at least to the anchoring device and configured to apply a pressure in a direction perpendicular to the first surface of the ultrasonic head compressing at least part of the proximal portion between the anchoring device and the ring seal, the pressure device further configured to transmit pressure to the ring seal producing a tight seal around the chamber.

2. The ultrasonic device according to claim 1, wherein the proximal portion of the ultrasonic head is at least partially defined by an ultrasonic amplifier disposed between the at least one sonotrode and the ultrasonic transducer.

3. The ultrasonic device according to claim 2, wherein the second nodal plane is disposed away from the joint between the at least one sonotrode and the ultrasonic amplifier.

4. The ultrasonic device according to claim 1, wherein substantially the entire proximal portion of the ultrasonic head is defined by the at least one sonotrode.

5. The ultrasonic device according to claim 1, wherein the distal portion of the ultrasonic head comprises a smaller diameter than the proximal portion of the ultrasonic head.

6. The ultrasonic device according to claim 5, wherein a transition between the distal portion of smaller diameter and the proximal portion of larger diameter substantially defines the first surface of the ultrasonic head.

7. The ultrasonic device according to claim 1, wherein the chamber is provided with a third surface, which is annular, disposed around the at least one sonotrode housing bore opposite to the first surface of the ultrasonic head, the third surface of the ultrasonic head being in contact with a second surface of the ring seal; the ring seal comprising a tubular body retained between the first surface and the third surface of the ultrasonic head.

8. The ultrasonic device according to claim 7, wherein the third surface of the ultrasonic head defines an annular seat configured to provide a substantially precise positioning of the ring seal.

9. The ultrasonic device according to claim 7, wherein the ring seal is a metallic or a ceramic ring seal.

10. The ultrasonic device according to claim 7, wherein the ring seal defines an inner gap with a larger cross section than the cross section of the distal portion of the at least one sonotrode.

11. The ultrasonic device according to claim 1, wherein the pressure device comprises a plurality of connectors, each one of the plurality of connectors attached on one end to the anchoring device and on another end to a body containing the chamber.

12. The ultrasonic device according to claim 1, wherein the pressure applied by the pressure device is greater than the pressure of the melted polymer of the chamber.

* * * * *